United States Patent
Christensen et al.

(10) Patent No.: US 6,188,758 B1
(45) Date of Patent: Feb. 13, 2001

(54) METHOD AND DEVICE IN TELECOMMUNICATIONS NETWORK

(75) Inventors: Sören Christensen, His; Paul Fjuk, Skjetten, both of (NO); Sören Wallinder, Haninge (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/144,973

(22) Filed: Sep. 1, 1998

(30) Foreign Application Priority Data

Sep. 2, 1997 (SE) .................................... 9703158

(51) Int. Cl.⁷ ...................................................... H04M 3/42
(52) U.S. Cl. ......................... 379/211; 379/201; 379/230
(58) Field of Search .................................... 379/211, 212, 379/229, 201, 207, 230

(56) References Cited

U.S. PATENT DOCUMENTS

| | | |
|---|---|---|
| 5,463,685 | 10/1995 | Gaechter et al. . |
| 5,465,295 * | 11/1995 | Furman ................................ 379/211 |
| 5,467,390 * | 11/1995 | Brankley et al. . |
| 5,490,210 | 2/1996 | Sasso . |
| 5,497,373 | 3/1996 | Hulen et al. . |
| 5,533,115 | 7/1996 | Hollenbach et al. . |
| 5,579,377 | 11/1996 | Rogers . |
| 5,724,409 * | 3/1998 | Malik et al. ..................... 379/212 X |

FOREIGN PATENT DOCUMENTS 0 604 042   6/1994   (EP) .

* cited by examiner

Primary Examiner—Creighton Smith
(74) Attorney, Agent, or Firm—Burns, Doane, Swecker & Mathis, L.L.P.

(57) ABSTRACT

A method and an apparatus manually route incoming calls in a network in which an individual subscriber may be reached by the same telephone number on a number of different terminals, depending on, e.g., the type of incoming call and the time of day. An incoming call is automatically directed to one telephone, from which the subscriber may select to direct the call, e.g., to a fax machine, or an answering service. The terminals in question may be specified by the subscriber and identified by short numbers. An SSP and an SCP may be adapted to perform the service.

7 Claims, 1 Drawing Sheet

METHOD AND DEVICE IN TELECOMMUNICATIONS NETWORK

This application claims priority under 35 U.S.C. §§ 119 and/or 365 to Application No. 9703158-7 filed in Sweden on Sep. 2, 1998; the entire content of which is hereby incorporated by reference.

TECHNICAL FIELD

The present invention relates to telecommunication networks and in particular to the manual routing of calls in such networks.

BACKGROUND

Today's telecommunication networks support a number of different services and, in fact, consist of a number of networks which are interconnected, such as Public Services Telephone Network (PSTN), various mobile or cellular networks, such as the GSM and NMT networks, and data communications networks, for example TCP/IP networks, such as the Internet.

An individual user may be reached on a number of different terminals, depending on the time of day and the type of service desired. For example, a user may typically be reached at a telephone in a business network at work, at a PSTN telephone at home and at a mobile telephone that is switched on only part of the time. At any time, the user can receive telefax on his personal number. The fax will be routed to a telefax machine in accordance with the user's temporary or permanent fax number.

It is possible to let the same, personal telephone number identify all the terminals to which one subscriber is connected. The problem then arises of routing incoming calls to the appropriate terminal.

U.S. Pat. No. 5,490,210 discloses a solution to the problem of automatically selecting a telephone or a telefax machine. A programmable interface device comprising a microprocessor is connected to a subscriber line. The microprocessor receives and interprets digital signals in the incoming traffic and controls the equipment connected to the interface device in dependence of the type of traffic. If the registered Dual Tone Multi Frequency (DTMF) signal indicates a telefax, the call is automatically connected to the telefax machine, if not, the call is connected to a telephone or an answering machine.

U.S. Pat. No. 5,497,373 describes a flexible interface which automatically performs protocol conversion between different types of traffic, such as voice mail, telefax, e-mail, DTMF tone detection, and so on.

None of these patents describe the possibility of manually routing an incoming call to the appropriate terminal. U.S. Pat. No. 5,490,210 also only describes the selection of two kinds of traffic: voice and telefax.

Manually routing an incoming call in many cases is a more flexible solution than automatic routing. Any kind of traffic may be handled, and terminals may be added or changed. Incoming calls may be handled in dependence of the momentary situation in a more flexible way than automatic routing will allow.

SUMMARY

It is an object of the present invention to provide a method and an apparatus for manually routing incoming calls to the appropriate terminal.

It is another object of the invention to provide a method and an apparatus which will allow the routing of any kind of traffic to the appropriate terminal.

The above mentioned and other objects are achieved according to the invention by a method comprising the following steps:
specifying available terminals and how each terminal is to be identified,
    automatically routing incoming calls in the network to one of the terminals assigned to the user,
    manually selecting an action according to the type of incoming call,
    automatically routing the call to a terminal in dependence of the action selected.

The subscriber may specify short numbers signifying the different terminals to which incoming calls for this subscriber are normally to be routed. The user may also specify the terminal to which the call should be routed at the time of the incoming call, by entering the terminals telephone number.

The solution according to the invention offers the following advantages: The incoming calls can be routed to the terminal that is most convenient at the moment, not necessarily following a particular schedule.

If the Calling Line Identity (CLI) or user name is displayed to the second subscriber, the calls may be received or routed to the answering service (or disconnected) depending on who is calling, and depending on the situation. For example, if the subscriber is temporarily busy, the person calling may be asked to wait a short time for the call to be answered.

The subscriber always knows when a fax or any kind of data has been received and at what terminal.

The fax or other terminal to which an incoming call is to be routed can be selected for each individual call. This is particularly useful for people who move around a lot, such as service personnel.

DETAILED DESCRIPTION

Figure 1:
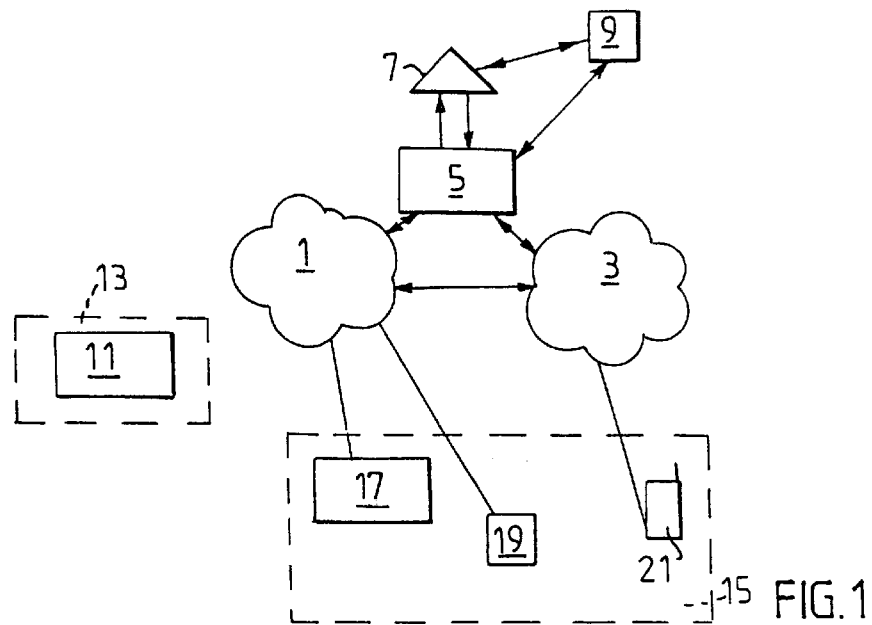
FIG. 1 is a schematic drawing of an intelligent network according to the invention.

FIG. 1 shows an intelligent network comprising a PSTN network 1 and a mobile telecommunications network 3. Both networks 1, 3 are connected to a Service Switching Point (SSP) 5 and a Service Control Point (SCP) 7. The SSP 5 performs the switching functions in an intelligent network, and is connected to the SCP 7, which comprises logical functions for controlling calls, for example rerouting information.

One or more Intelligent Peripheries (IP) 9 may be connected to both the SSP 5 and the SCP 7. The IPs comprise information which may be used by the SSP 5 and the SCP 7 in the handling of calls, such as subscriber profiles. The IPs may also comprise databases for information, such as an answering service and/or a fax mailbox.

A number of terminals, such as telephones, telefaxes and computers are connected to the networks 1, 3. In this example, a first telefax 11 belonging to a first subscriber 13, is connected to the PSTN network 1. A second subscriber 15 has a number of different terminals for different types of communication: a telefax 17, a Personal Computer (PC) 19, and a mobile telephone 21. Other types of terminals are possible, for example a PSTN telephone. All terminals belonging to the second subscriber 15 may be reached by dialling the same number, according to the procedure shown in FIG. 2.

The second subscriber 15 has defined short number codes each signifying one of the terminals 17, 19 and 21. For example, dialling "1" may mean that the call should be directed to the telefax machine, dialling "2" may mean that the call should be directed to the PC, and so on. These codes could be conveyed to the SSP (5) in the form of DTMF signals or in any other way known in the art. Note that the codes are not restricted to single digits, but may be any combination of keys. It would be possible to have special keys on the telephone dedicated to this function.

Another code may be used to signify that the call should be directed to a terminal other than the prespecified terminals. Entering this code would allow the subscriber to enter the number of the terminal to which the call should be directed. This may be useful, for example, if the subscriber wishes to receive a fax but is not in his usual environment.

Other codes could be used to specify other kinds of services. For example, if the subscriber wishes to answer the phone but has to finish something first, the caller may be informed that the call will be answered soon and asked to wait, for example 10, 30 or 60 seconds.

The PC 19 is connected to the PSTN network 1 through a data network (not shown) and may be used for data and telefax connections and for making and receiving telephone calls. The PC 19 preferably comprises handling software, which enables the user to receive a phone call or to reroute a call to one of the predetermined terminals or services or to another terminal as explained above. The software may, for example, be implemented as a web page on the Internet, which should preferably be implemented in an interactive programming language, such as Java.

The second subscriber 15 may of course have other types of terminals as well, for example, an answering machine and a PSTN telephone. He may also be connected to certain services in the intelligent network, such as an answering service or a fax mailbox, which are implemented in IPs, or in any other known way, in connection to the SCP. Each of these terminals and services may be associated with a predetermined code.

Terminals in an Intelligent Services Digital Network (ISDN) may also be used in accordance with the invention.

Figure 2:
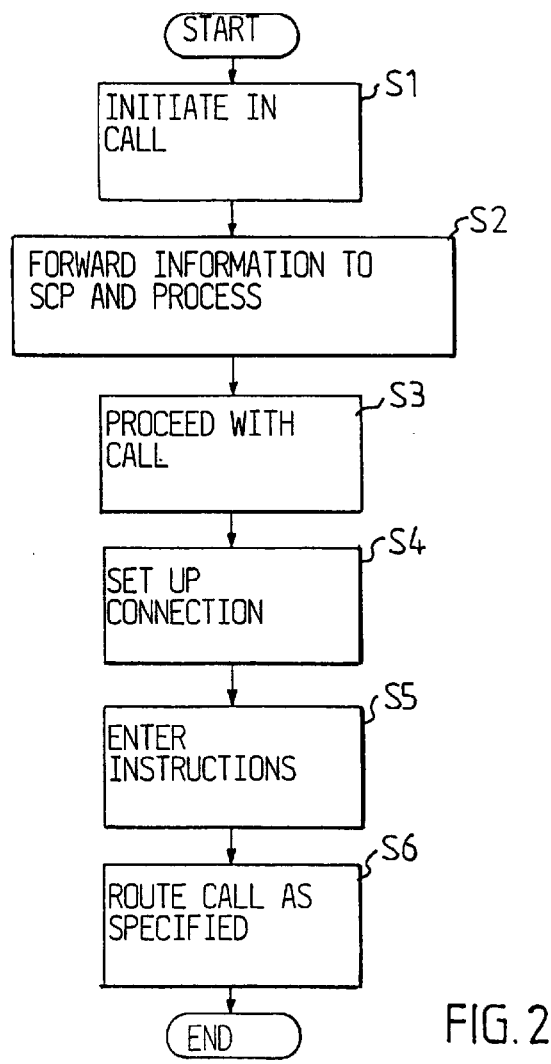
FIG. 2 is a flow chart of the actions taken when a call is routed according to the invention.

FIG. 2 is a flow chart of the actions that take place when the first subscriber 13 of FIG. 1 tries to send a telefax to the second subscriber 15, according to the invention.

Step S1: The first subscriber dials the telephone number of the second subscriber 15. As explained above, the same number is used for all types of connections, fax, data, voice etc.

Step S2: The SSP 5 receives the call and retrieves information about the call, such as the A number, which is forwarded to the SCP 7. The SCP 7 forwards the data and determines how the call should be handled.

Step S3: When the processing in the SCP 7 is completed, the SCP 7 instructs the SSP 5 to proceed with the call, for example to route the call towards the mobile telephone 21 of the second user 15.

Step S4: When the second subscriber answers, a speech channel connection the first 13 and the second 15 subscriber is set up through the SSP 5. The second subscriber 15 may then determine how the call should be handled.

Step S5: The second subscriber 15 determines the type of call, and instructs the SSP 5 to forward the call to the appropriate terminal. In this example, the call should be forwarded to the telefax 17. It could instead be forwarded to a fax mailbox or a computer. One of a number of fax numbers specified in advance could be selected, or another fax number could be specified.

The type of call may be determined in a number of different ways: The subscriber can hear if a call is an ordinary speech connection or a fax connection. If Calling Line Identity (CLI presentation is used, the subscriber may be able to determine the type of call based on the CLI, if he knows the type of terminal connected on that number. It may be feasible to use special number series for different types of equipment to assist this. Another possibility would be to include information about the type of call in the request for connection. This information could be presented visually together with the CLI or by a voice message when the subscriber answers the phone. The inclusion of such information would require some modification of the transmitter equipment.

Step S6: The SSP 5 routes the call to the appropriate terminal according to the instructions received in step S5.

In a preferred embodiment, the instructions sent from the second subscriber 15 in step S5 are DTMF signals, as discussed above. Instead of DTMF signalling, any other type of signalling known in the art may be used, for example voice simgalling. For example, the word "fax", spoken within a predetermined time after the call has been set up, might cause the call to be routed to the fax machine, and so on.

Of course the manual routing function may be combined with an automatic routing function, so that when the manual routing function is turned off, the calls are automatically routed according to a predetermined scheme. Also, the terminal to which the incoming call is first routed by the SSP may change depending on the time, so that, for example, during work hours incoming calls would be routed to the office telephone, to be routed from this phone, and at other times incoming calls would be routed to the home telephone.

The incoming calls may also be automatically routed to the telephone that was last used by the user.

What is claimed is:

1. A method for manually routing incoming calls to a user in a telephone network in which a number of terminals are used by the same user, the method comprising the following steps:

specifying available terminals and how each terminal is to be identified;

automatically routing incoming calls in the network to one of the terminals assigned to the user;

manually selecting an action according to the type of incoming call, wherein the selection is performed by the called subscriber at the time of the incoming call; and automatically routing the call to a terminal depending on the action selected.

2. A method according to claim 1, further comprising a step of specifying short codes for difference terminals to which incoming calls may be directed.

3. A method according to claim 1, further comprising a step of specifying the terminal to which the call should be routed at the time of the incoming call.

4. A method according to claim 1, further comprising a step of informing the subscriber about the type of incoming call in connection with Calling Line Identity (CLI) information.

5. A method according to claim 1, further comprising a step of informing the subscriber about the type of incoming call when the subscriber answers the call.

6. A Service Switching Point (SSP) adapted to request and receive and instructions from a Service Control Point (SCP) in a telecommunications network in which the same number may signify more than one terminal, wherein the SSP:

routes an incoming call made to a telephone number signifying more than one terminal, to one of these terminals, in dependence of instructions received from the SCP;

receives instructions from the terminal receiving the call regarding what terminal the call should be routed to; and routes the incoming call to the appropriate terminal according to the instructions.

7. A Service Switching Point according to claim 6, wherein the SSP receives instructions from the terminal receiving the call, in the form of DTMF signals and acts on these instructions according to information stored in the intelligent network.

* * * * *